United States Patent [19]

Elsea

[11] Patent Number: 5,450,690
[45] Date of Patent: Sep. 19, 1995

[54] FLORAL BOUQUET HOLDER

[75] Inventor: Marilyn J. Elsea, Belleville, Ill.

[73] Assignee: W. E. Design Group, Inc., Belleville, Ill.

[21] Appl. No.: 208,842

[22] Filed: Mar. 9, 1994

Related U.S. Application Data

[63] Continuation-in-part of Ser. No. 5,793, Mar. 10, 1993.

[51] Int. Cl.⁶ ............................ A01G 5/00; A47G 7/00
[52] U.S. Cl. .................................. 47/41.01; 220/476; 220/8; 248/311.2
[58] Field of Search ................. 47/41.11, 41.01; 248/311.2, 231.7, 231.6, 27.8; 220/476, 8

[56] References Cited

U.S. PATENT DOCUMENTS

| | | | |
|---|---|---|---|
| 80,776 | 8/1868 | Smith | 220/8 |
| 2,049,645 | 8/1936 | Fleckles | 220/8 |
| 2,062,684 | 12/1936 | Thomas | 47/41.11 |
| 2,330,868 | 10/1943 | Chappory | 248/311.2 |
| 3,867,019 | 2/1975 | Eyerman | 135/108 |
| 3,913,878 | 10/1975 | Wayne | 248/311.2 |
| 3,987,993 | 10/1976 | Hopkins | 248/311.2 |
| 3,991,961 | 11/1976 | Platzer, Jr. | 248/311.2 |
| 4,036,463 | 7/1977 | Hopkins et al. | 248/311.2 |
| 5,007,612 | 4/1991 | Manfre | 248/311.2 |
| 5,190,257 | 3/1993 | Gradei et al. | 248/311.2 |

Primary Examiner—Ramon S. Britts
Assistant Examiner—Joanne C. Downs
Attorney, Agent, or Firm—Paul M. Denk

[57] ABSTRACT

A floral bouquet holder is provided which may be removably secured to the edge of a table. The holder includes a tube which is mounted to a bracket. The bracket is formed so that the holder may be mounted to tables of various widths. The holder may include an inner tube which is vertically slidable in the tube to which the bracket is secured. The bracket tube includes a stop screw which may be tightened against the inner tube to selectively position the inner tube vertically with respect to the bracket tube.

11 Claims, 4 Drawing Sheets

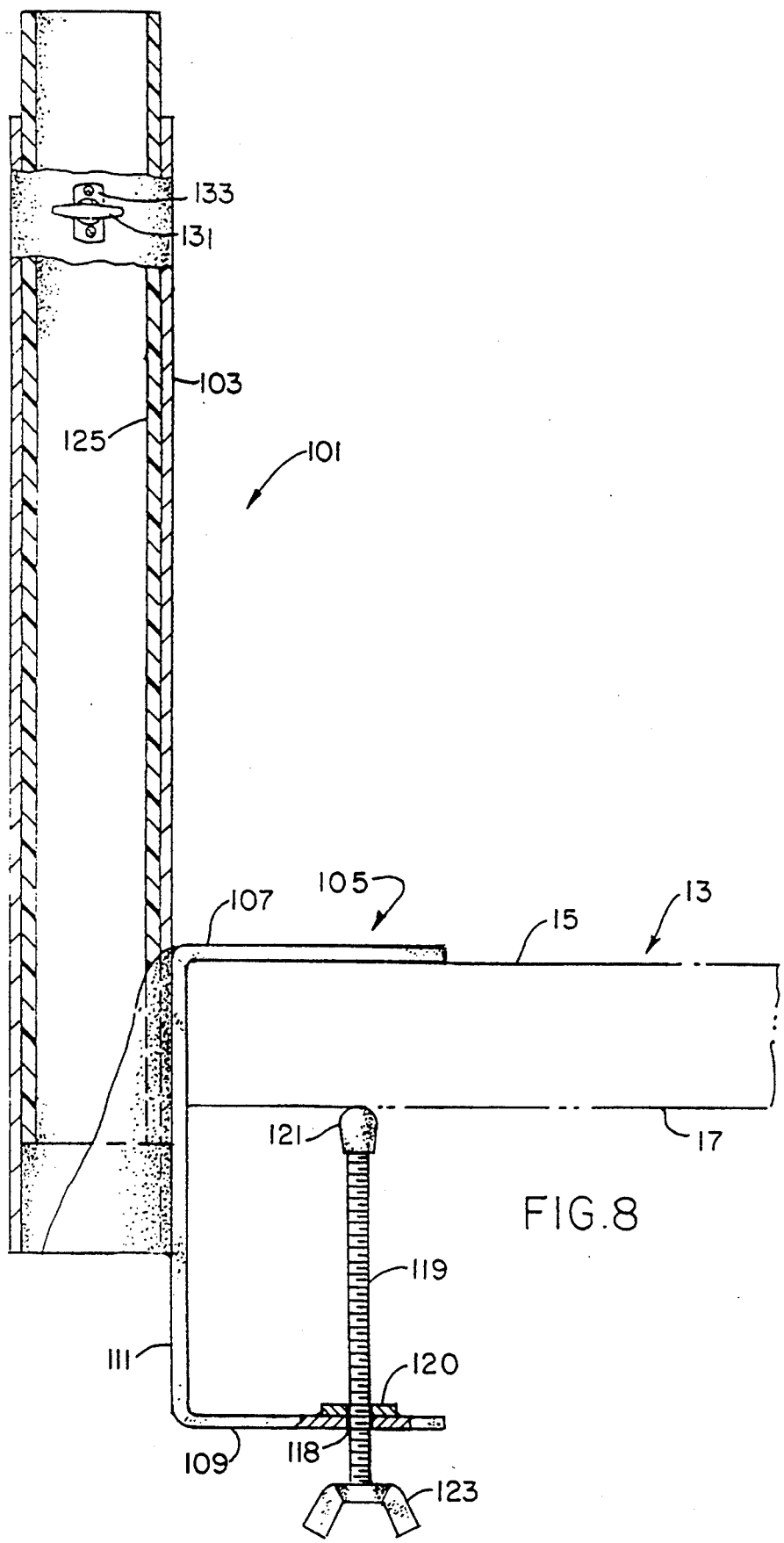

FLORAL BOUQUET HOLDER

CONTINUING APPLICATION DATA

This is a continuation-in-part of application Ser. No. 29/005,793, filed Mar. 10, 1993, and which is incorporated herein by reference.

BACKGROUND OF THE INVENTION

This invention relates to bouquet holders, and in particular to floral bouquet holders which may be removably secured to the edge of a table, such as a wedding or banquet table or a work table.

Floral bouquets are generally provided on tables at events such as weddings, banquets, etc. Generally, the floral arrangement is placed in a vase which is set on the table. With respect to the head table at such events, it is often desirable to place the bouquet at the front of the table. To ensure that the bouquet will not fall off the table, it is desirable to secure the bouquet to the table in some manner.

When a floral arrangement is being made, it is also desirable to mount the bouquet holder to a table edge to prevent the bouquet from tipping while it is being worked on.

SUMMARY OF THE INVENTION

One object of the present invention is to provide a floral bouquet holder which may be removable secure to a table top.

Another object is to provide such a bouquet holder in which the level of the bouquet can be selectively set.

Another object is to provide such a bouquet holder which is easy to operate and economical to produce.

These and other objects will become apparent to those skilled in the art in light of the following disclosure and accompanying drawings.

Briefly stated, a floral bouquet holder is provided to removably secure a bouquet of flowers or the like to the edge of a table. The holder includes a tube which is mounted to a bracket. The bracket includes an upper leg and a lower leg joined by a web. The upper and lower legs are spaced apart a distance greater than the width of the table top so that the holder may be used with tables of varying widths. The lower leg has a screw hole formed therein through which a screw extends. The screw is threaded through the hole to bear against the underside of the table top to secure the bouquet holder on the table. Preferably, the screw is provided with a rubber tip so that the screw will not mar the table top and a wing at the bottom so that it may be easily operated by hand, without the need for screwdrivers or other tools. The bottom leg of the bracket preferably extends below the bottom of the tube so that the tube bottom is approximately level with the bottom of the table top. The tube may be level with, or extend above the top of, the bracket upper leg, to accommodate various sizes of bouquets.

In one embodiment, the tube is an outer tube and is provided with an inner tube which directly receives the bouquet. The inner tube is slidable in the outer tube and the outer tube includes a stop screw which may be tightened against the inner tube to selectively position the inner tube in the outer tube. The outer tube is made of metal. The inner tube is thus preferably made of a plastic to protect the outer tube from rusting.

BRIEF DESCRIPTION OF THE DRAWINGS

FIG. 8 is a cross-sectional view of the bouquet holder.

DESCRIPTION OF THE PREFERRED EMBODIMENT

Figure 1:
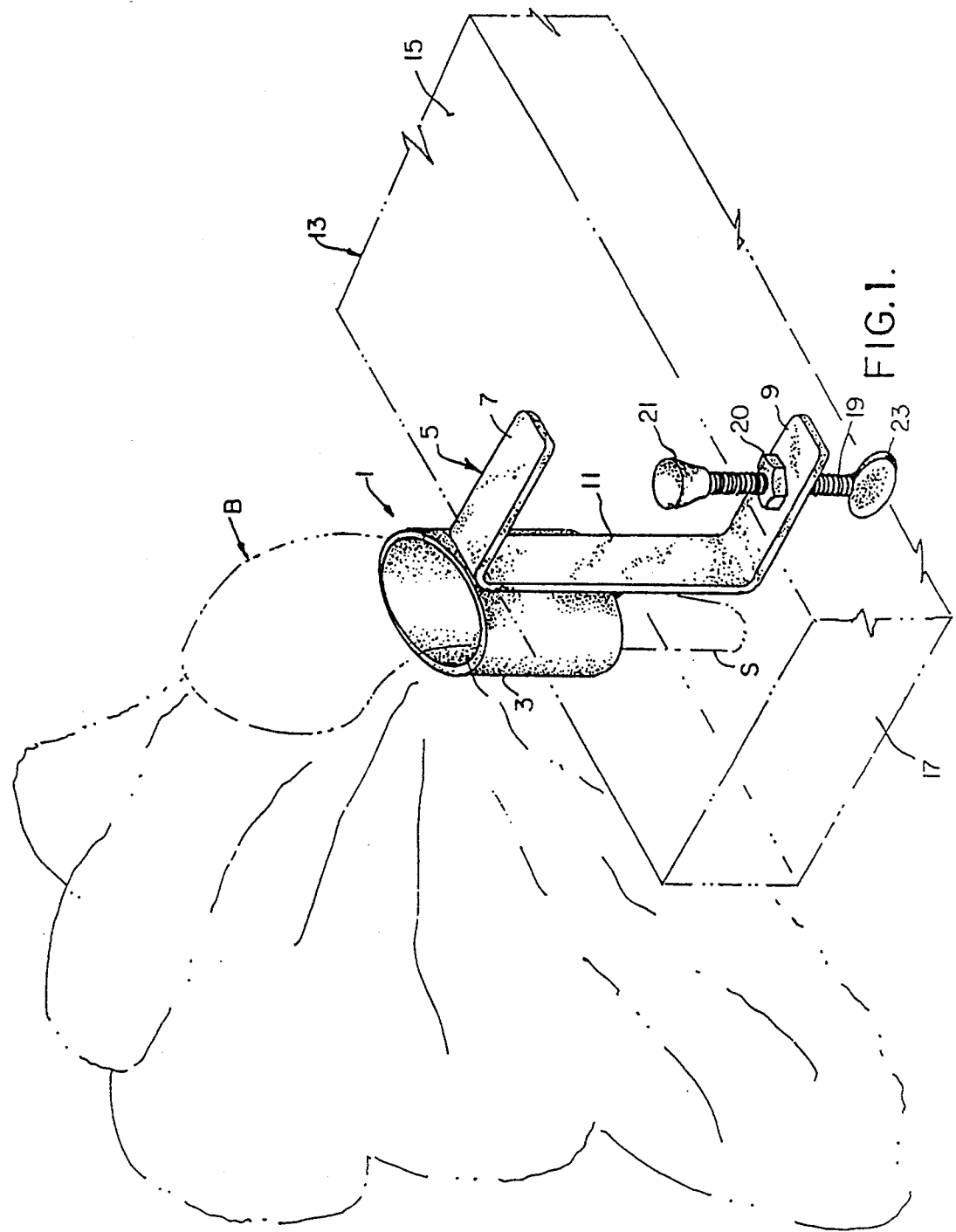
FIG. 1 is a perspective view of a floral bouquet holder secured to a table.
Figure 2:
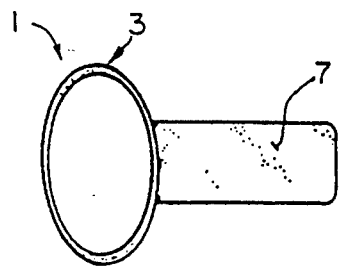
FIG. 2 is a top plan view of the bouquet holder.
Figure 3:
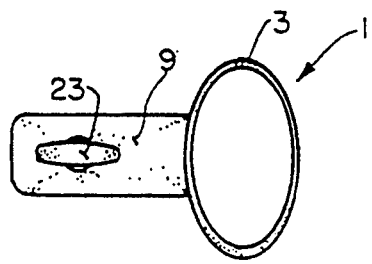
FIG. 3 is a bottom plan view of the bouquet holder.
Figure 4:
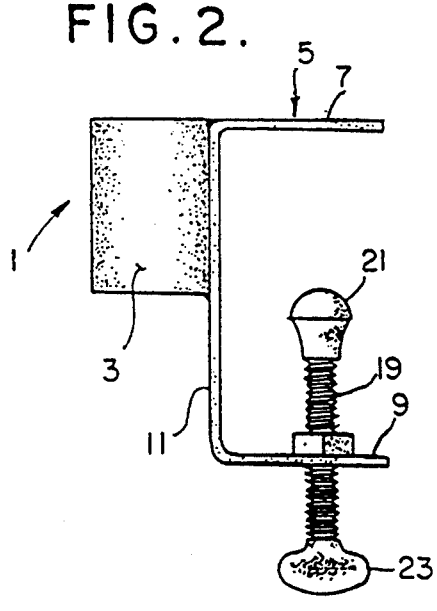
FIG. 4 is a side elevational view of the bouquet holder.
Figure 5:
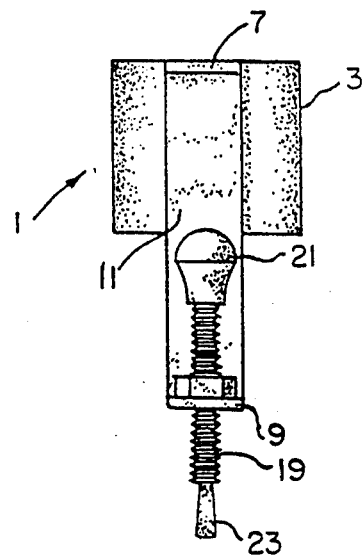
FIG. 5 is a back elevational view of the bouquet holder.
Figure 6:
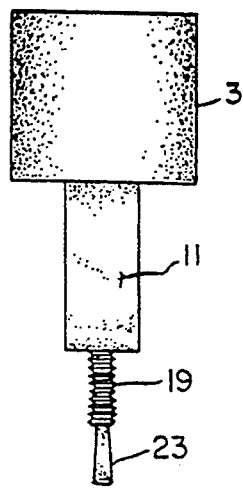
FIG. 6 is a front elevational view of the bouquet holder.

A bouquet holder 1 of the present invention is shown in FIGS. 1–6. Holder 1 includes a tube 3 which is hollow and preferably open at its top and bottom. Tube 3 is preferably oval, but may be formed in other shapes. Tube 3 is secured to a bracket 5 such as by welding. Bracket 5 includes an upper leg 7 and a lower leg 9 which are spaced apart by a web 11. Preferably, web 11 is longer than tube 3. As seen in FIG. 1, tube 3 has a length approximately equal to the width of the table top 13 to which it is secured. The tube 3 and bracket 5 are welded together so that the top of tube 3 is approximately flush with the bracket's top leg 7.

Bracket 5 is used to secure the holder 1 to the edge of a table top 13 having an upper surface 15 and a lower surface 17. Bracket legs 7 and 9 are spaced apart a distance greater than the width of table top 13 so that the holder may be used with table tops of varying widths. This is best seen in FIG. 8. Lower leg 9 has a bolt hole (not shown) formed therein which accepts a screw 19. A nut 20 is preferably secured to bracket leg 9 to be in alignment with the bolt hole. Nut 20 provides the threads for screw 19 if the bolt hole itself is not threaded. Screw 19 preferably has a rubber cover 21 covering the top of the screw and a wing 23 formed at the bottom of the screw. The screw is rotated in the hole to screw the top of the screw against the bottom surface 17 of table top 13 to secure the holder 1 to the table. Again, as best seen in FIG. 8, the rubber cap 21 is provided so that the screw will not scratch, or otherwise mar, the bottom of the table top 13.

In use, a bouquet B of flowers is held in the tube 3, with the stems S of the flowers extending through the tube and out the bottom of the tube. The positioning of the screw 19 allows for the securement of the holder 1 to the table top 13 either before or after the bouquet B has been placed in the tube 3. This thus allows for the bouquet to be made in the tube while the tube is secured to a work table and then once finished, the holder, with the bouquet in tact, can be removed from the work table and moved to a banquet table which the bouquet will adorn.

Figure 7:
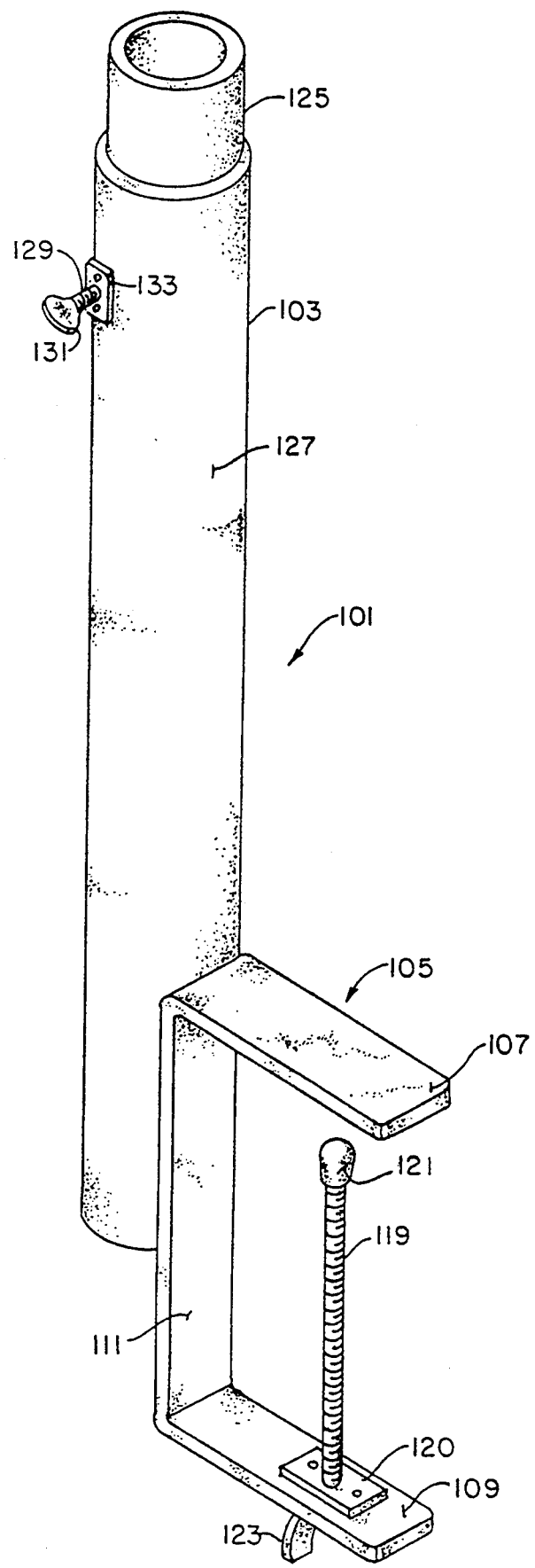
FIG. 7 is a perspective view of a second embodiment of the bouquet holder.

Turning to FIGS. 7 and 8, a second embodiment 101 of the bouquet holder is shown. Bouquet holder 101 is substantially similar to holder 1. However, it has a long external tube 103 which is secured to bracket 105. Tube 103 is preferably a right cylinder, but like tube 3, can be formed in any desired shape. Bracket 105 is identical to bracket 5 and includes upper and lower legs 107 and 109 separated by a web 111. A screw 119 having a rubber tip 121 and a wing 123 at its bottom is threaded through a hole 118 in the bottom leg 109 and a threaded member 120.

Tube 103, however, slidably carries an inner tube 125 which is vertically slidable within the outer tube 103. Inner tube 125 is shaped complimentary to tube 103, having an outer diameter that is only slightly smaller than the outer tube's inner diameter. Outer tube 103 has a screw hole (not shown) formed it its wall 127, preferably near the top of the tube, which receives a screw 129 having a wing 131 at its outer end. Screw 129 is a stop screw which is screwed into the hole to bear against inner tube 125 to hold tube 125 in a desired position relative to outer tube 103. Screw 129 preferably extends along a radius of the outer tube 103, so that the tip of the screw will bear fully against the inner tube 125. Hole 127 may be threaded, or a nut, threaded washer, or the like 133 may be provided through which the screw 129 is threaded. Threaded element 133, like elements 20 and 120, is provided to provide threads and support for the screw.

Tubes 3 and 103, as well as brackets 5 and 105, are made of metal. Inner tube 125 is preferably made from a plastic, such as PVC, which will not rust in the presence of water. The use of inner tube 125 will thus extend the useful life of the holder 101. Further, the tube allows the bouquet B to be raised or lowered relative to the tube 103 as desired, to achieve a desired height of the bouquet when the tube is in use.

As can be appreciated, a bouquet holder is provided which will securely hold a bouquet against the edge of a table to either display or create the bouquet. Variations within the scope of the appended claims may be apparent to those skilled in the art. Although the tubes are preferably open, they may be closed at the bottoms thereof. Inner tube 125, which is preferably as long as outer tube 103, may be made in other desired lengths, either shorter or longer than tube 103. Although screw 129 is received near the top of the outer tube 103, it could be placed elsewhere. This would only effect the height to which inner tube 125 may be raised. The tubes may also be made of stainless steel, or another rust resistant metal. A different positioning means may be provided to position the inner tube with respect to the outer tube. A pin which extend through holes in the inner tube may be used. A slight protrusion may be formed on the inner surface of the outer tube wall which interacts with a dimple on the outer surface of the inner tube. These examples are merely illustrative.

I claim:

1. A floral bouquet holder which is removably securable to a table top to removably secure a floral bouquet to the table, the bouquet holder including: a tube, said tube being opened entirely centrally therethrough to accommodate the insertion of the bouquet therethrough, a bracket secured to the tube near a bottom of the tube, said bracket including an upper leg and a lower leg joined by a web, with said upper and lower legs being spaced apart a distance greater than the width of the table top, and said upper and lower legs extending laterally from the said tube, the web being secured to the tube, one of the upper and lower legs having a screw hole formed therein for receiving a screw which extends through the screw hole to bear against a surface of the table top to secure the bouquet holder onto the table, said bracket web extending below the bottom of the tube, said lower leg being spaced from the bottom of the tube, and wherein the top of the tube extends above the top of the bracket upper leg.

2. A floral bouquet holder which is removably securable to a table top to removably secure a floral bouquet to the table, the bouquet holder including: a tube, said tube being opened entirely centrally therethrough to accommodate the insertion of the bouquet therethrough, a bracket secured to the tube near a bottom of the tube, said bracket including an upper leg and a lower leg joined by a web, said upper and lower legs being spaced apart a distance greater than the width of the table top, and said upper and lower legs extending laterally from the tube, the web being secured to the tube, one of the upper and lower legs having a screw hole formed therein for receiving a screw which extends through the screw hole to bear against a surface of the table top to secure the bouquet holder onto the table, said bracket web extending below the bottom of the tube, said lower leg being spaced from the bottom of the tube, the top of the tube extending above the top of the bracket upper leg, said tube comprising an outer tube, said bouquet holder including an inner tube which receives the bouquet, the inner tube being received in said outer tube, said inner tube being slidable vertically relative to said outer tube, said outer tube including locking means for selectively fixing said inner tube in a desired position relative to said outer tube, said locking means including a stop screw threadably received in said outer tube through a wall thereof, and said stop screw bearing against the inner tube to secure the inner tube in place as vertically adjusted within the outer tube.

3. The floral bouquet holder of claim 2 wherein the stop screw is positioned near a top of the outer tube.

4. The floral bouquet holder of claim 2 wherein the inner tube has a length no greater than the length of the outer tube.

5. The floral bouquet holder of claim 2 wherein the inner tube is made of a non-rusting material.

6. The floral bouquet holder of claim 5 wherein the inner tube is made of plastic.

7. The floral bouquet holder of claim 6 wherein the outer tube has a metallic outer surface.

8. A floral bouquet holder which is removably securable to a table top to removably secure a floral bouquet to the table, the bouquet holder including:
   an elongate external tube; said external tube being opened entirely centrally therethrough to accommodate the insertion of a bouquet therethrough;
   a bracket secured to the tube near a bottom of the tube, said bracket including an upper leg and a lower leg joined by a web, the upper and lower legs being spaced apart a distance greater than the width of the table top, and said upper and lower legs extending laterally from said external tube, the web being secured to the tube, one of the upper and lower legs having a screw hole formed therein for receiving a screw which extends through the screw hole to bear against a surface of the table top to secure the bouquet holder onto the table; and
   an inner tube opened entirely centrally therethrough and which receives the bouquet, the inner tube being received in said external tube, said inner tube being slidable vertically relative to said external tube, said external tube including a screw hole for receiving a stop screw which bears against the inner tube to secure the inner tube in place as adjusted in the external tube.

9. The floral bouquet holder of claim 8 wherein said external tube is metallic, and said inner tube is plastic.

10. The floral bouquet holder of claim 8 wherein said external tube screw hole is positioned near the top of the tube.

11. The floral bouquet holder of claim 9 wherein said bracket screw includes a rubber cap on a top of said bracket screw, said rubber cap contacting said table top when said holder is secured to said table top.

* * * * *